(12) United States Patent
Lee et al.

(10) Patent No.: US 8,192,036 B2
(45) Date of Patent: Jun. 5, 2012

(54) REARVIEW MIRROR ADJUSTMENT SYSTEM FOR TRAILER ATTACHED VEHICLE

(75) Inventors: Jin-Woo Lee, Rochester Hills, MI (US); Jihan Ryu, Rochester Hills, MI (US); Kwang-Keun Shin, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 967 days.

(21) Appl. No.: 12/190,231

(22) Filed: Aug. 12, 2008

(65) Prior Publication Data

US 2010/0039721 A1    Feb. 18, 2010

(51) Int. Cl.
 *G02B 7/18* (2006.01)
(52) U.S. Cl. .......................................... 359/843; 701/49
(58) Field of Classification Search .................... 701/49; 359/843, 841, 871–877; 248/476–480, 487
See application file for complete search history.

(56) References Cited

U.S. PATENT DOCUMENTS

| | | | | |
|---|---|---|---|---|
| 3,383,154 A | * | 5/1968 | Reed | 359/843 |
| 4,609,265 A | * | 9/1986 | McKee et al. | 359/843 |
| 5,541,778 A | * | 7/1996 | DeFlorio | 359/843 |
| 6,390,631 B1 | | 5/2002 | Lang et al. | |
| 2003/0151835 A1 | * | 8/2003 | Su et al. | 359/843 |
| 2006/0155444 A1 | | 7/2006 | Lee et al. | |
| 2006/0262432 A1 | * | 11/2006 | Sakamoto et al. | 359/841 |
| 2007/0263301 A1 | * | 11/2007 | Agrest | 359/843 |

FOREIGN PATENT DOCUMENTS

WO        WO9801320 A1    1/1998

* cited by examiner

*Primary Examiner* — Jennifer L. Doak
(74) *Attorney, Agent, or Firm* — John A. Miller; Miller IP Group, PLC (57) ABSTRACT

A system and method for automatically correcting the viewing angle of a rear-view mirror on a vehicle towing a trailer when the vehicle is traveling around a curve. If the dimensions of the trailer are unknown, then the corrected viewing angle is the same as the hitch angle between the vehicle and the trailer. If the dimensions of the trailer are known, then trigonometry is used to determine the corrected viewing angle. Depending on whether the road is curving to the right or to the left will determine whether the left side rear-view mirror or the right side rear-view mirror is adjusted.

13 Claims, 7 Drawing Sheets

REARVIEW MIRROR ADJUSTMENT SYSTEM FOR TRAILER ATTACHED VEHICLE

BACKGROUND OF THE INVENTION

1. Field of the Invention

This invention relates generally to a system and method for adjusting the rear-view mirrors of a vehicle towing a trailer and, more particularly, to a system and method for automatically adjusting the rear-view mirrors of a vehicle towing a trailer based on a hitch angle between the vehicle and the trailer.

2. Description of the Related Art

The automotive industry makes considerable effort to improve the safety of vehicles and their occupants. One of the areas of concern has been the limited field-of-view provided by the rear-view mirrors of the vehicle.

Rear-view mirrors of a vehicle are oriented to provide the driver of the vehicle with an optimum rear viewing zone behind and towards the left and towards the right of the vehicle. For manually adjustable rear-view mirrors, the rear viewing zone is a fixed region of space in the vicinity of the vehicle, which is at a particular orientation relative to the vehicle. The orientation of the rear viewing zone can be adjusted by adjusting the rear-view mirrors.

When the vehicle is traveling on the road, where the profile of the road is changing, a fixed rear viewing zone may limit the view of the driver and may lead to accidents involving pedestrians, bicycle riders and other vehicles not seen by the driver because of the fixed rear viewing zone. In such cases there is a need to correct the rear viewing zone of the mirror to get a desired view.

The problem of a limited rear viewing zone becomes even more prominent in the case of vehicles towing a trailers tractor-trailers, articulated buses and the like as the line of sight is further limited due to the bending of the vehicle combination.

One existing system that addresses the above-mentioned problem for vehicles towing trailers determines the change in distance between the vehicle and the trailer to identify that the vehicle is making a turn, and adjusts the rear-view mirror accordingly to optimize the rear viewing zone. The system makes use of magnetic field sensors mounted on the vehicle and the trailer. However, the use of magnetic sensors leads to problems because there are a number of electrical devices in a vehicle that may affect the functioning of such magnetic sensors. Further, this system can only be used for vehicles towing a trailer.

Another existing system provides an automatic adjustment of rear-view mirrors based on the turning of the vehicle around a vertical axis. However, this system does not adjust the rear-view mirrors when the vehicle is moving downhill or uphill.

SUMMARY OF THE INVENTION

In accordance with the teachings of the present invention, a system and method are disclosed for automatically correcting the viewing angle of a rear-view mirror on a vehicle towing a trailer when the vehicle is traveling around a curve. The system estimates the curvature of the road based on suitable available signals. The road curvature estimation is used to determine the radius of curvature of the road, which can then be used to determine a corrected viewing angle of the rear-view mirror. If the dimensions of the trailer are unknown, then the corrected viewing angle is the same as the hitch angle between the vehicle and the trailer. If the dimensions of the trailer are known, then trigonometry is used to determine the corrected viewing angle. Depending on whether the road is curving to the right or to the left will determine whether the left side rear-view mirror or the right side rear-view mirror is adjusted.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for automatically changing the viewing angle of a rear-view mirror of a vehicle towing a trailer in response to road curvature is merely exemplary in nature, and is in no way intended to limit the invention or its applications or uses.

Figure 1:
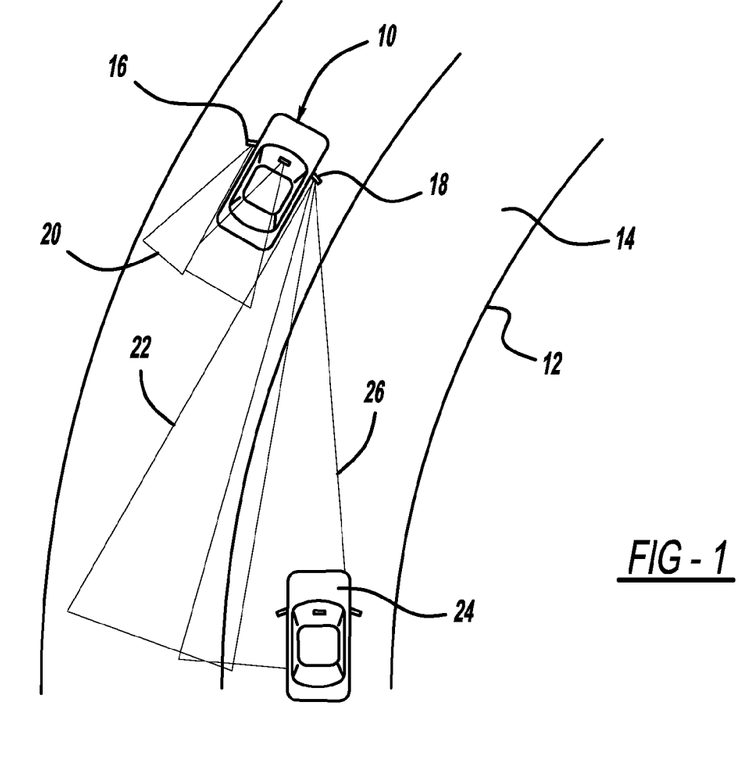
FIG. 1 is an illustration of a vehicle traveling around a curve showing a corrected viewing angle of a right side rear-view mirror of the vehicle.

FIG. 1 is an illustration of a vehicle 10 traveling around a curve 12 in a road 14. The vehicle 10 includes a left side rear-view mirror 16 and a right side rear-view mirror 18. The left side rear-view mirror 16 includes a normal rear viewing zone 20 and the right side rear-view mirror 18 includes a normal rear viewing zone 22. The rear viewing zones 20 and 22 are set by the vehicle driver for his size and seat position so that the driver is able to see the most optimum rear viewing zone when the vehicle is traveling straight. Because it is not reasonable for the driver to make adjustments to the rear-view mirrors 16 and 18 while he or she is driving, the rear viewing zones 20 and 22 will not be optimum when the vehicle 10 is traveling around the curve 12. Particularly, when the rear-view mirror 18 is in its normal viewing position, a vehicle 24 traveling along an inside lane of the road 14 around the curve 12 may not be seen by the driver using the normal rear viewing zone 22. Therefore, the present invention proposes a technique, as will be discussed in detail below, for automatically correcting the viewing angle of the rear-view mirror 18 a proper amount based on the degree of curvature of the curve 12 to provide a corrected rear viewing zone 26 so that the vehicle 24, and possibly other vehicles and objects, will be visible to the driver of the vehicle 10.

Figure 2:
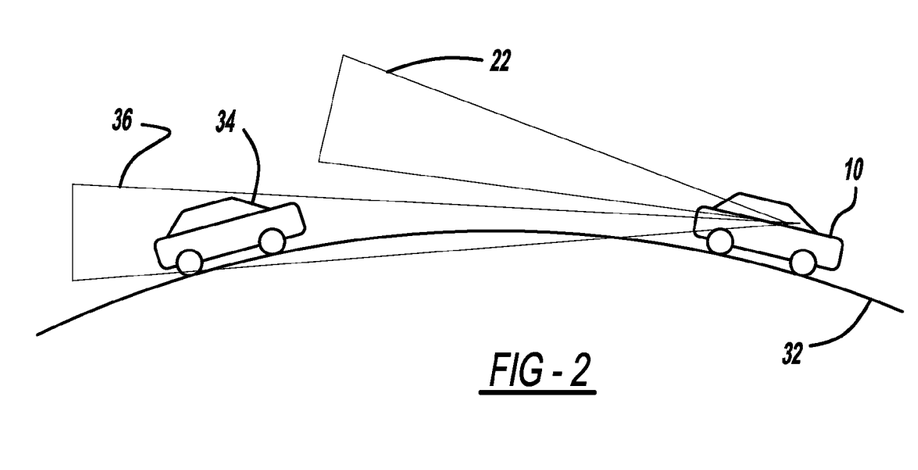
FIG. 2 is an illustration of a vehicle traveling over a hill showing a corrected viewing angle of the side rear-view mirrors of the vehicle.

FIG. 2 is an illustration of the vehicle 10 traveling down a hill 32 where the normal rear viewing zones 20 and 22 of the rear-view mirrors 16 and 18 will be directed upward because of the slope of the hill 32 so that objects, such as vehicle 34, may not be in the rear viewing zones 20 and 22. As will be discussed in detail below, the present invention proposes automatically changing the viewing angle of the rear-view mirrors 16 and 18 a proper amount based on the slope of the hill 32 to provide a corrected rear viewing zone 36 were the vehicle 34 will be visible to the driver of the vehicle 10.

Figure 3:
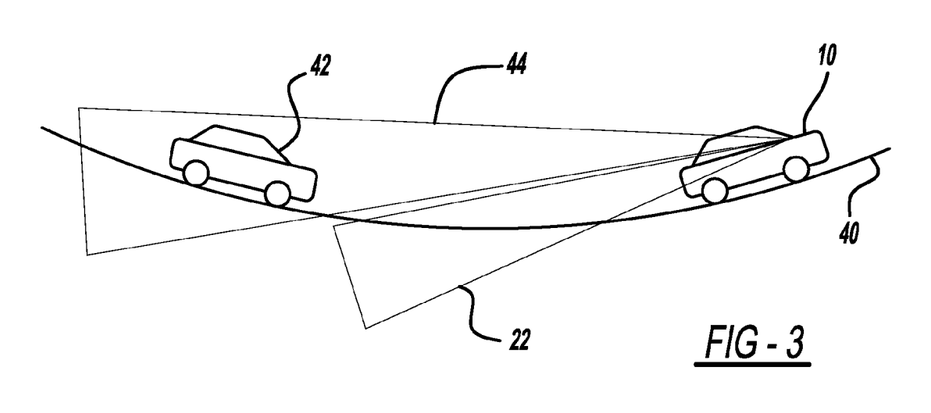
FIG. 3 is an illustration of a vehicle traveling up a hill showing a corrected viewing angle of the side rear-view mirrors of the vehicle.

FIG. 3 is an illustration of the vehicle 10 traveling up a hill 40 where the normal rear viewing zones 20 and 22 of the rear-view mirrors 16 and 18 will be directed downward because of the slope of the hill 40 so that objects, such as vehicle 42, may not be in the rear viewing zones 20 and 22. Therefore, as will be discussed in detail below, the present invention proposes automatically changing the viewing angle of the rear-view mirrors 16 and 18 a proper amount based on the slope of the hill 40 to provide a corrected rear viewing zone 44 were the vehicle 42 will be visible to the driver of the vehicle 10.

Figure 4:
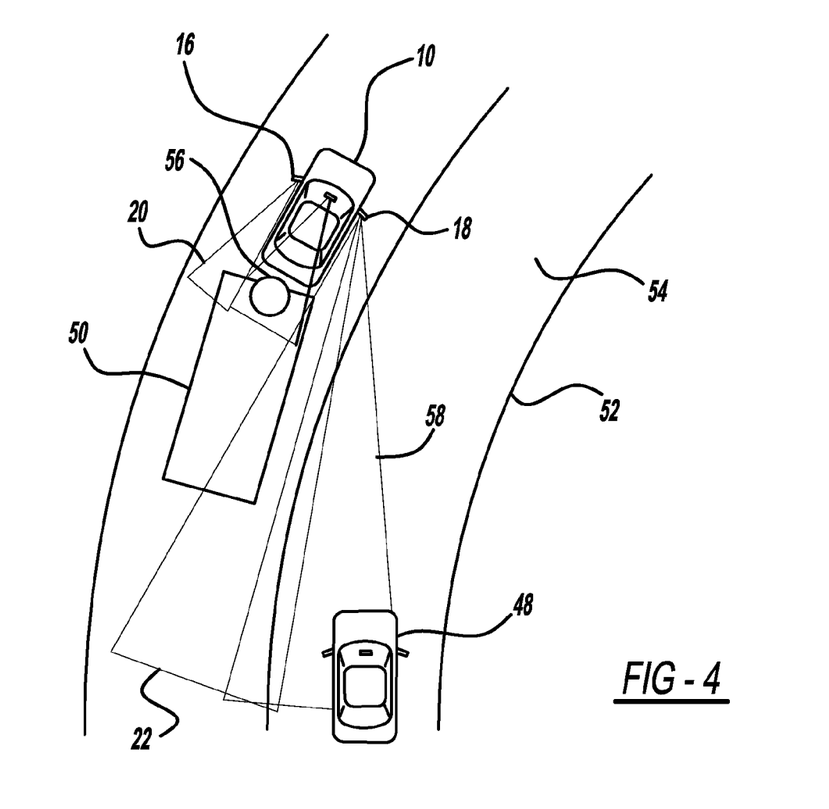
FIG. 4 is an illustration of a vehicle towing a trailer around a curve showing a corrected viewing angle of the right side rear-view mirror of the vehicle.

The present invention also proposes automatically changing the rear viewing zone of the rear-view mirrors 16 and 18 if the vehicle 10 is towing a trailer around a curve. FIG. 4 is an illustration of the vehicle 10 towing a trailer 50 around a curve 52 in a road 54. In this embodiment, the vehicle 10 is equipped with a hitch angle sensor 56 that measures the hitch angle between the hitch post on the vehicle 10 and the hitch post on the trailer 50 to provide rear viewing angle correction. Because the trailer 50 blocks some of the rear viewing of the rear-view mirrors 16 and 18, the present invention proposes automatically changing the viewing angle of the rear-view mirrors 16 and 18 a proper amount based on the degree of curvature of the curve 52 and the dimensions of the trailer 50 to provide a corrected rear viewing zone 58 were a vehicle 48 will be visible to the driver of the vehicle 10. As will be discussed below, the corrected rear viewing zone 58 is turned out farther than the corrected rear viewing zone 26 when the curvature of the curves 12 and 52 is the same.

Figure 5:
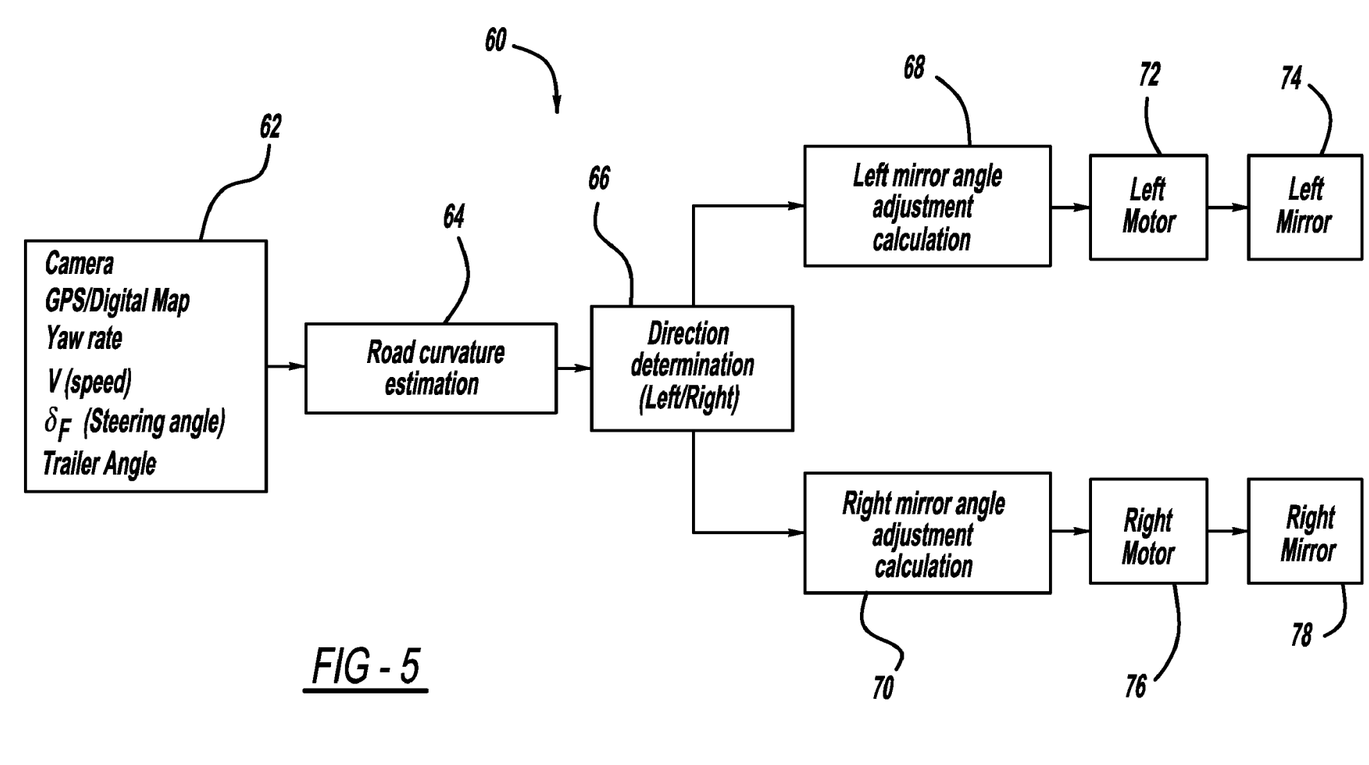
FIG. 5 is a block diagram of a system that corrects the viewing angle of a rear-view mirror of a vehicle, according to an embodiment of the present invention.

FIG. 5 is a block diagram of a mirror angle adjustment system 60, according to an embodiment of the present invention. Box 62 is intended to represent one or more devices and/or sensors that are on the vehicle 10 that will provide vehicle parameters and/or road curvature information so that the system 50 can calculate the proper amount that the rear-view mirrors 16 and 18 need to be adjusted to provide the optimum rear viewing angle. These sensors and devices can include one or more of a camera, a GPS receiver, a digital map, a vehicle speed sensor, a vehicle steering angle sensor, a yaw-rate sensor, a hitch angle sensor, etc. It will be readily apparent to any person with ordinary skill in the art that other parameters than those suggested can be used to determine the curvature of the road.

The various parameters from the box 62 are sent to a road curvature estimation processor 64 that calculates the curvature of the road based on the input signals and associated algorithms, as will be discussed in detail below. In this context, road curvature also refers to an uphill and downhill slope of the road. The road curvature information from the processor 64 is then sent to a direction determination processor 66 that determines which way the road is curving, either up, down, left, right, up and to the left, up and to the right, down and to the left and down and to the right. For those road curvatures only to the right, only the right side rear-view mirror 18 is adjusted. For those road curvatures only to the left, only the left side rear-view mirror 16 is adjusted. For those road curvatures up or down, both of the rear-view mirrors 16 and 18 are adjusted.

Depending on the direction determination by the direction determination processor 66, the road curvature information is sent to a left mirror angle adjustment calculation processor 68 and/or a right mirror angle adjustment calculation processor 70 to determine the proper adjustment to the side rear-view mirrors 16 and/or 18. Depending on the calculated adjustment angle for the left side rear-view mirror 16 from the processor 68, a left side motor 72 will adjust the mirror 16 at box 74. Likewise, depending on the calculated adjustment angle for the right side rear-view mirror 18 from the calculation processor 70, a right side motor 76 will adjust the mirror 18 at box 78.

According to one embodiment of the present invention, the only information that is available from the box 62 to determine the curvature ρ of the road is vehicle speed and steering angle. There may be various reasons why the vehicle does not have other information that can be used to determine road curvature, such as the GPS receiver is out, the vehicle is not equipped with a GPS receiver, the vehicle is not equipped with digital maps, the yaw-rate sensor has failed, etc.

Figure 6:
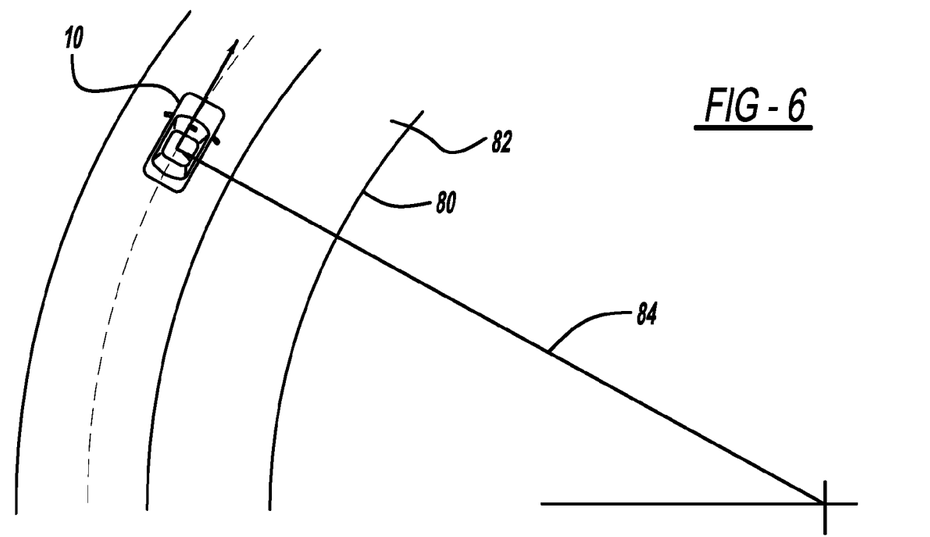
FIG. 6 is an illustration of a vehicle traveling around a curve depicting the turning radius of the vehicle.

FIG. 6 is an illustration of the vehicle 10 traveling around a curve 80 in a road 82, where line 84 represents the turning radius R of the vehicle 10. Using equation (1) below, the curvature ρ of the curve 80 can be calculated with just the vehicle speed υ and the vehicle steering angle along with Other known and fixed parameters. The road curvature ρ is equal to the reciprocal of the turning radius R as 1/R. From the road curvature ρ, the corrected viewing angle Δα of the rear-view mirrors 16 or 18 can be calculated.

$$\rho = \frac{\frac{1}{L}}{1 + \frac{K_{us}V^2}{Lg}} (\delta_f - \delta_r) \tag{1}$$

Where L is the wheel base of the vehicle 10, $K_{us}$ is a coefficient, υ is the vehicle speed, g is acceleration due to gravity, $\delta_F$ is the front wheel steering angle and $\delta_R$ is the rear steering angle.

Figure 7:
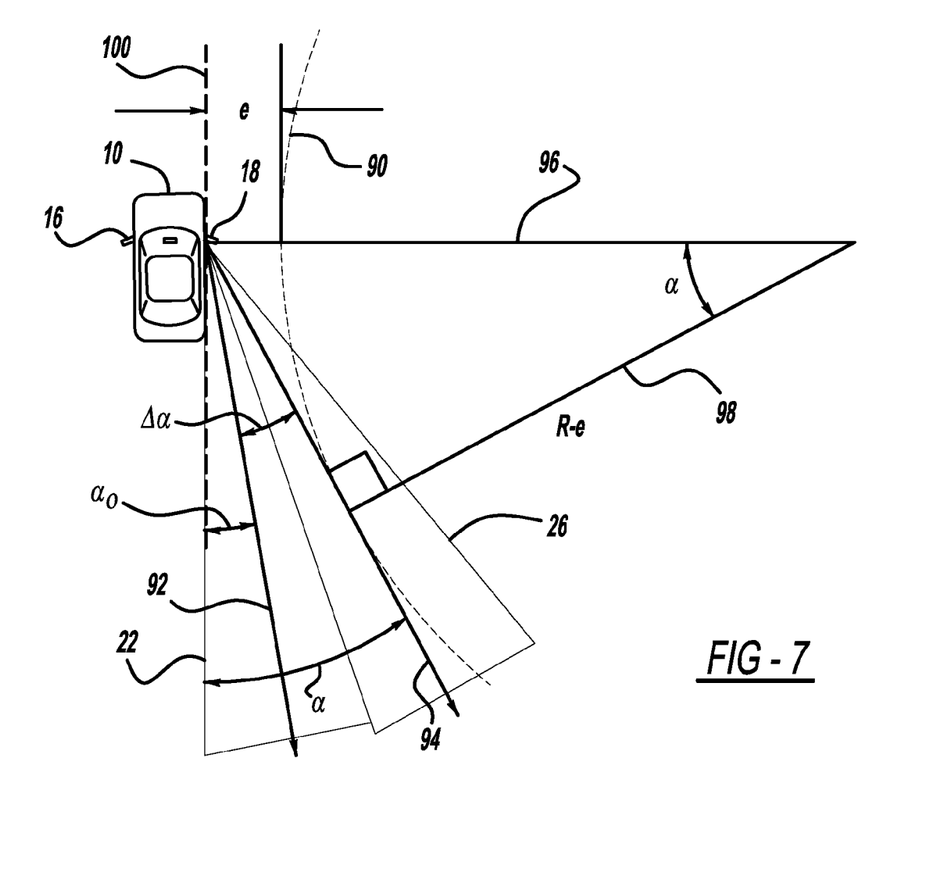
FIG. 7 is an illustration of a vehicle traveling around a curve showing various variables that are used to determine the corrected viewing angle of a side rear-view mirror of the vehicle.

FIG. 7 is an illustration of the vehicle 10 traveling around a curve 90. The normal rear viewing zone 22 of the right side rear-view mirror 18 is defined by an original line of sight 92 and the corrected rear viewing zone 26 of the mirror 18 is defined by a corrected line of sight 94, where the corrected viewing angle Δα is the angle between the lines 92 and 94. The radius of curvature ρ is identified by line 96 and a value e is defined as the distance between the edge of the curve 90 and a line 100 that is a side line of the vehicle 10. Line 98 represents the distance between the point of origin and the corrected line of sight 94, and is defined as R−e. The angle between the lines 96 and 98 and the angle between the line 100 and the corrected line of sight 94 are the same and defined as α. The angle $\alpha_0$ is an original angle between the line 100 and the line 92. Further, the curvature value $\rho_o$ and $\Delta\rho$ are intermediate variables. The actual mirror correction value $\theta$ provided by the motors 72 and 76 is $\theta=\Delta\alpha/2$. Based on the following equations, the corrected viewing angle $\Delta\alpha$ can be determined as follows.

$$\cos(\alpha) = \frac{R-e}{R} = 1 - ep \qquad (2)$$

$$\alpha = \alpha_o + \Delta\alpha \quad \rho = \rho_o + \Delta\rho \qquad (3)$$

$$\rho_o = \frac{1-\cos(\alpha_o)}{e} \qquad (4)$$

$$\Delta\alpha = \left(\frac{d\alpha}{d\rho}\right)\Delta\rho \qquad (5)$$

$$\frac{d\alpha}{d\rho} = \frac{e}{\sin(\alpha)} = \frac{e}{\sqrt{e\rho(2-e\rho)}} \qquad (6)$$

$$\Delta\alpha = \alpha - \alpha_o = \frac{e}{\sqrt{e\rho(2-e\rho)}}(\rho - \rho_o) \qquad (7)$$

Figure 8:
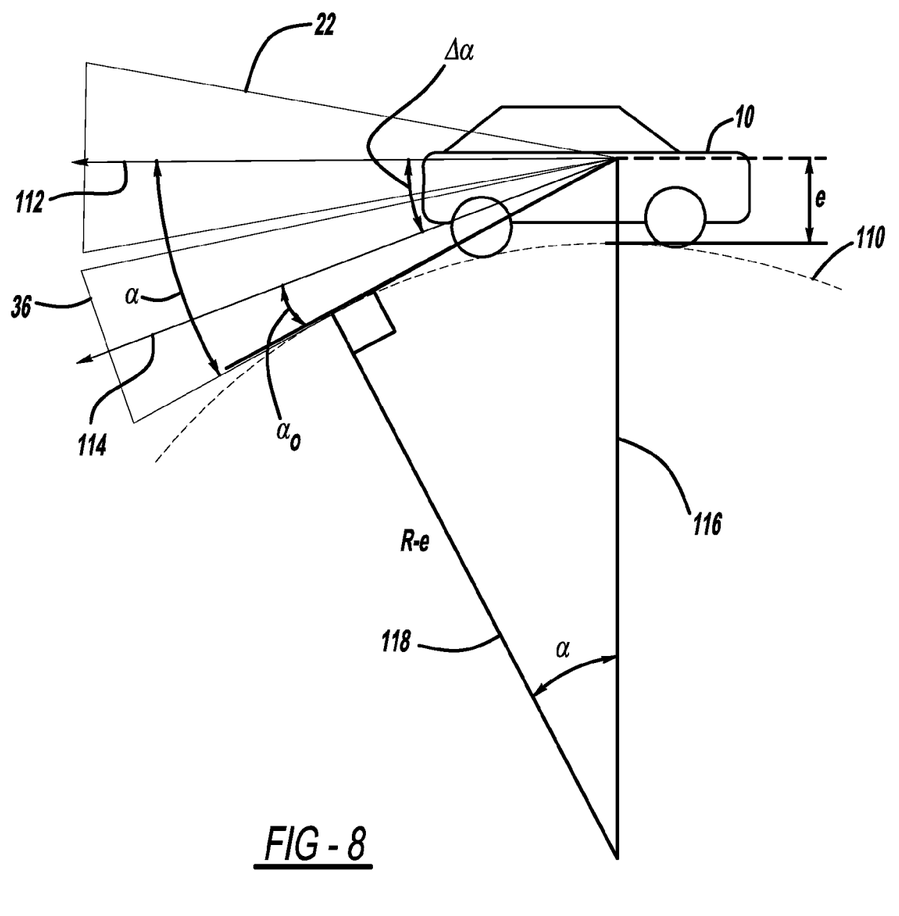
FIG. 8 is an illustration of a vehicle traveling over a hill showing variables that are used to determine a corrected viewing angle of the rear-view mirrors of the vehicle.

FIG. 8 is an illustration of the vehicle 10 traveling over a hill 110, where the viewing angle of the mirrors 16 and 18 will be turned down to provide the optimum rear viewing zone based on the slope of road. An original line of sight 112 is defined for the normal rear viewing zone 22 and a corrected line of sight 114 is defined for the corrected rear viewing zone 36. The corrected viewing angle $\Delta\alpha$ between the lines 112 and 114 is determined in the same manner as discussed above for FIG. 7, where line 116 represents the line 96 and line 118 represents the line 98. In this embodiment, the value e is the height of the mirror 16 or 18 above the ground. Therefore, equations (2)-(7) can be used in the same manner to determine the corrected viewing angle $\Delta\alpha$.

In the embodiment for determining the corrected viewing angle $\Delta\alpha$ when the vehicle 10 is traveling uphill or downhill, the curvature $\rho$ of the hill 110 cannot be determined by the vehicle speed and the steering angle. Therefore, the road curvature $\rho$ needs to be determined by other methods at the box 64, such as GPS receiver, maps, etc.

Figure 9:
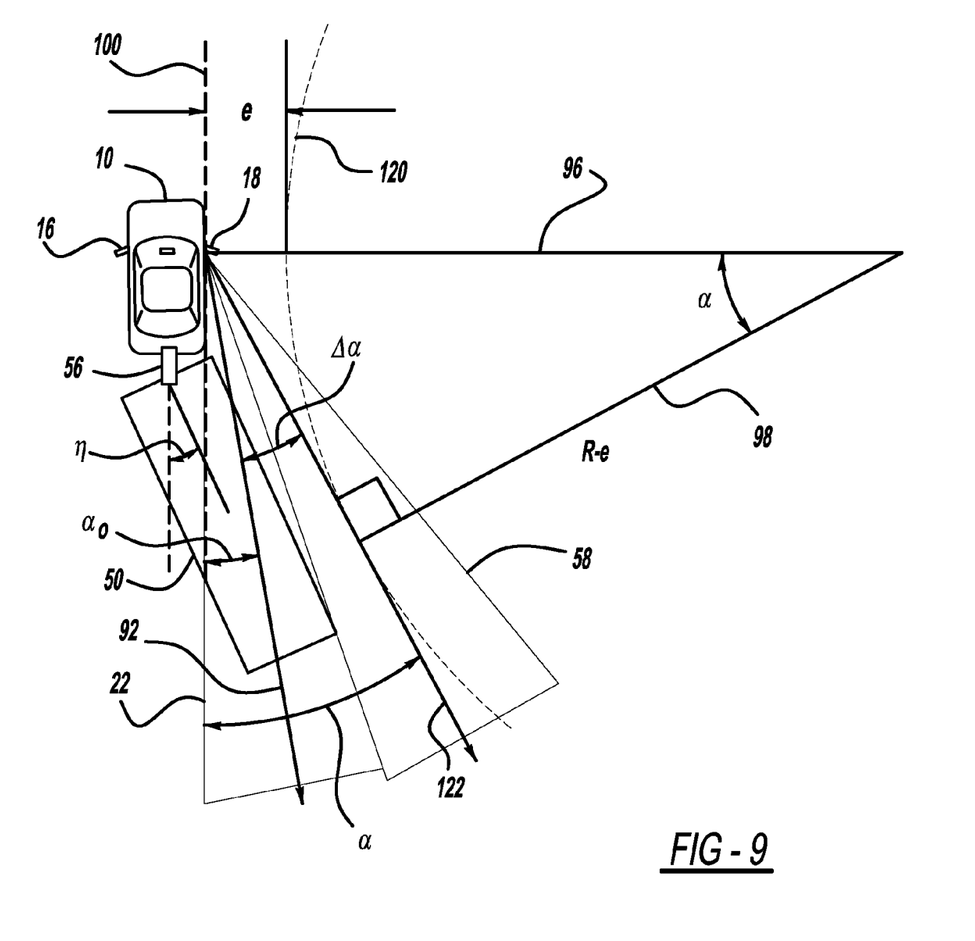
FIG. 9 is an illustration of a vehicle towing a trailer around a curve showing variables that are used to determine a corrected viewing angle of the ride side rear-view mirror of the vehicle.

FIG. 9 is an illustration of the vehicle 10 pulling the trailer 50 around a curve 120. In this embodiment, the sensors and other devices at the box 62 would also include the hitch angle sensor, and the left mirror angle adjustment calculation processor 68 and the right mirror angle adjustment calculation processor 70 would calculate the corrected viewing angle of the rear-view mirrors 16 and 18, respectively, as discussed below. Because the vehicle 10 is towing the trailer 50, the corrected viewing angle $\Delta\alpha$ will need to be greater than if the vehicle 10 was not towing the trailer 50 for the same radius of curvature $\rho$ of the road. The corrected rear viewing zone 58 of the mirror 18 is defined by a corrected line of sight 122. In this calculation for the corrected viewing angle $\Delta\alpha$, the hitch angle $\eta$ from the hitch angle sensor 56 is used. If the length and the width of the trailer 50 are not known, then the corrected viewing angle $\Delta\alpha$ is set to be equal to the hitch angle $\eta$. However, if the width and the length of the trailer 50 are known, then a more accurate corrected viewing angle $\Delta\alpha$ can be obtained.

Figure 10:
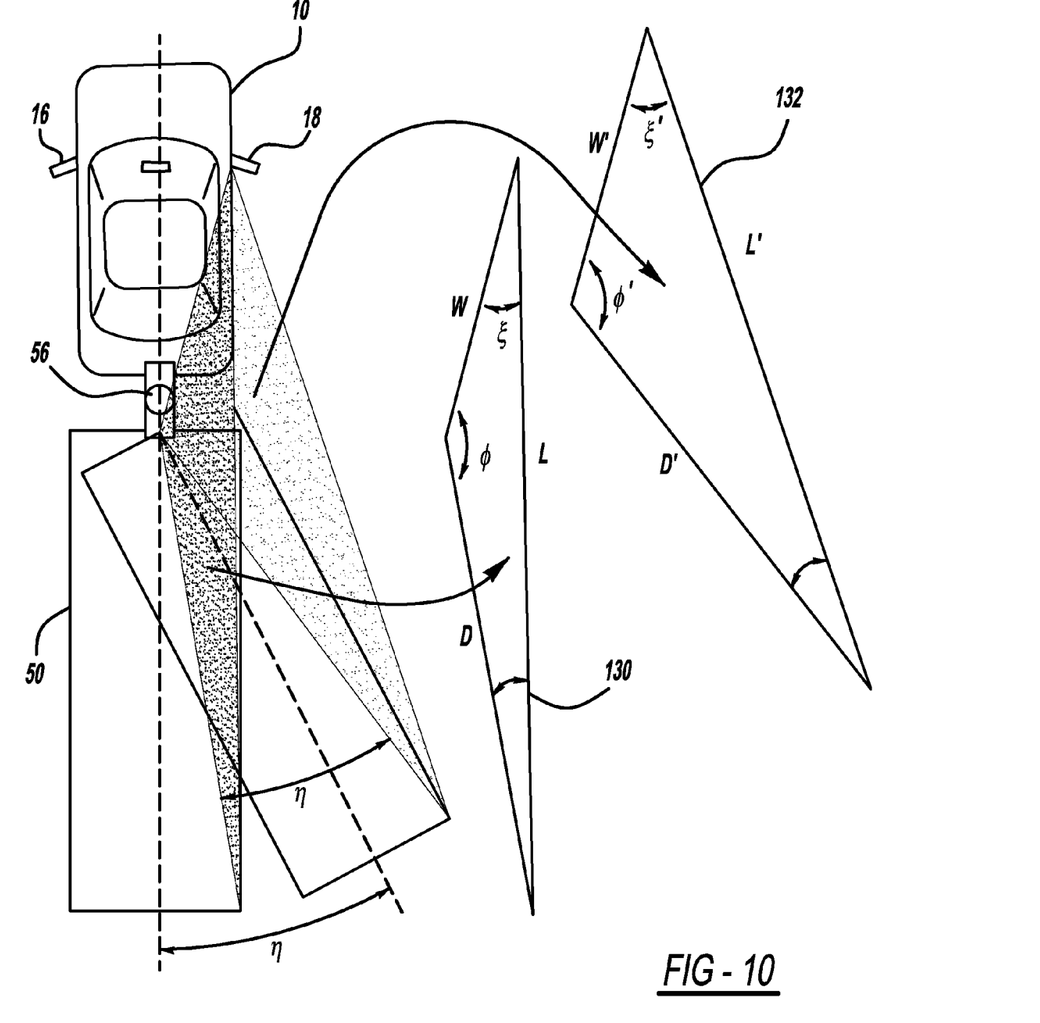
FIG. 10 is an illustration of a vehicle towing a trailer showing the trailer in a straight orientation and an angled orientation, and defining triangles that are used to calculate a corrected viewing angle for a rear-view mirror on the vehicle when the trailer dimensions are known.

FIG. 10 is another illustration of the vehicle 10 towing the trailer 50, where the trailer 50 is shown in a straight orientation when the vehicle 10 is traveling straight and is shown in an angled orientation when the vehicle 10 is traveling around a curve. FIG. 10 is provided to show a triangle 130 when the trailer 50 is straight between the right side rear-view mirror 18, the front-center of the trailer 50 and the rear right corner of the trailer 50. A triangle 132 is also shown for the same points when the trailer 50 is in the angled configuration. The triangle 130 includes the angles $\phi$ and $\zeta$ and the side dimensions W, L and D. Likewise, the triangle 132 includes the angles $\phi'$ and $\zeta'$ and the side dimensions W', L' and D'. Because the dimensions of the trailer 50 are known, the variables W, L, D, $\phi$ and $\zeta$ are also known. From these values, the following equations can be used to calculate the corrected viewing angle $\Delta\alpha$ based on the angle of the trailer 50.

$$W = W', D = D' \qquad (8)$$

$$\varphi' = \varphi - \eta \qquad (9)$$

$$L'^2 = D'^2 + W'^2 - 2D'W'\cos\varphi' \qquad (10)$$

$$\zeta' = \sin^{-1}\left(\frac{D'}{L'}\sin\varphi'\right) \qquad (11)$$

$$\Delta\alpha_{trailer} = \zeta' - \zeta \qquad (12)$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for correcting a viewing angle of a rear-view mirror on a vehicle that is towing a trailer when the vehicle is traveling around a curve, said method comprising:
   identifying a hitch angle between the vehicle and the trailer;
   calculating a corrected mirror viewing angle using the hitch angle, wherein if the length and width of the trailer are known, calculating a corrected mirror viewing angle includes identifying two triangles where a first triangle is for when the vehicle is traveling straight and the trailer is not angled relative to the vehicle and the second triangle is for when the vehicle is traveling around a curve and the trailer is angled relative to the vehicle, said first and second triangles both including a first side from the rear-view mirror being corrected to a front-center location of the trailer, a second side from the front-center location of the trailer to a rear corner of the trailer on the side of the trailer that the mirror being corrected is on and a third side from the rear corner of the trailer to the mirror being corrected; and
   changing the viewing angle of the rear-view mirror using the corrected viewing angle.

2. The method according to claim 1 wherein if the width and length of the trailer is unknown, the hitch angle is used as the corrected mirror viewing angle.

3. The method according to claim 1 wherein calculating a corrected mirror viewing angle includes using the equations W=W', D=D', $\phi'=\phi-\eta$, $L'^2=D'^2+W'^2-2D'W'$, $$\zeta' = \sin^{-1}\left(\frac{D'}{L'}\sin\varphi'\right) \text{ and}$$

$\Delta\alpha_{trailer}=\zeta'-\zeta$, where W is the length of the first side of the first triangle, W' is the length of the first side of the second triangle, D is the length of the second side of the first triangle, D' is the length of the second side of the second triangle, L' is the length of the third side of the second triangle, $\phi$ is the angle between the first and second sides of the first triangle, $\phi'$ is the angle between the first and second sides of the second triangle, $\eta$ is the hitch angle, $\zeta$ is the angle between the first and third sides of the first triangle and $\zeta'$ is the angle between the first and second triangle.

4. The method according to claim 1 wherein only the viewing angle of the rear-view mirror on the side of the vehicle towards which the trailer is angled is corrected.

5. A method for correcting a viewing angle of a rear-view mirror on a vehicle that is towing a trailer when the vehicle is traveling around a curve, said method comprising:
determining that the trailer is at an angle relative to the vehicle;
calculating a corrected mirror viewing angle when the trailer is angled relative to the vehicle, wherein calculating a corrected mirror viewing angle includes identifying two triangles where a first triangle is for when the vehicle is traveling straight and the trailer is not angled relative to the vehicle and the second triangle is for when the vehicle is traveling around a curve and the trailer is angled relative to the vehicle, said first and second triangles both including a first side from the rear-view mirror being corrected to a front-center location of the trailer, a second side from the front-center location of the trailer to a rear corner of the trailer on the side of the trailer that the mirror being corrected is on and a third side from the rear corner of the trailer to the mirror being corrected; and
changing the viewing angle of the rear-view mirror using the corrected viewing angle.

6. The method according to claim 5 wherein determining that the trailer is at an angle relative to the vehicle includes using a hitch angle sensor to determine a hitch angle between the vehicle and the trailer.

7. The method according to claim 6 wherein if the width and length of the trailer is unknown, the hitch angle is used as the corrected mirror viewing angle.

8. The method according to claim 5 wherein calculating a corrected mirror viewing angle includes using the equations W=W', D=D', $\phi'=\phi-\eta$, $L'^2=D'^2+W'^2-2D'W'$, $$\zeta' = \sin^{-1}\left(\frac{D'}{L'}\sin\varphi'\right) \text{ and}$$

$\Delta\alpha_{trailer}=\zeta'-\zeta$, where W is the length of the first side of the first triangle, W' is the length of the first side of the second triangle, D is the length of the second side of the first triangle, D' is the length of the second side of the second triangle, L' is the length of the third side of the second triangle, $\phi$ is the angle between the first and second sides of the first triangle, $\phi'$ is the angle between the first and second sides of the second triangle, $\eta$ is the hitch angle, $\zeta$ is the angle between the first and third sides of the first triangle and $\zeta$ the angle between the first and third sides of the second triangle.

9. The method according to claim 5 wherein only the viewing angle of the rear-view mirror on the side of the vehicle towards which the trailer is angled is corrected.

10. A system for correcting a viewing angle of a rear-view mirror on a vehicle that is towing a trailer when the vehicle is traveling around a curve, said system comprising:
a hitch angle sensor that provides a hitch angle signal identifying the hitch angle between the vehicle and the trailer; and
a controller for calculating a corrected mirror angle using the hitch angle signal, said controller causing the viewing angle of the rear-view mirror to be changed using the corrected viewing angle, wherein if the length and width of the trailer are known, the controller identifies two triangles where a first triangle is for when the vehicle is traveling straight and the trailer is not angled relative to the vehicle and the second triangle is for when the vehicle is traveling around a curve and the trailer is angled relative to the vehicle, said first and second triangles both including a first side from the rear-view mirror being corrected to a front-center location of the trailer, a second side from the front-center location of the trailer to a rear corner of the trailer on the side of the trailer that the mirror being corrected is on and a third side from the rear corner of the trailer to the mirror being corrected.

11. The system according to claim 10 wherein if the width and length of the trailer is unknown, the hitch angle is used as the corrected mirror viewing angle.

12. The system according to claim 10 wherein the controller uses the equations W=W', D=D', $\phi'=\phi-\eta$, $L'^2=D'^2+W'^2-2D'W'$, $$\zeta' = \sin^{-1}\left(\frac{D'}{L'}\sin\varphi'\right) \text{ and}$$

$\Delta\alpha_{trailer}=\zeta'-\zeta$ to calculate the corrected viewing angle, where W is the length of the first side of the first triangle, W' is the length of the first side of the second triangle, D is the length of the second side of the first triangle, D' is the length of the second side of the second triangle, L' is the length of the third side of the second triangle, $\phi$ is the angle between the first and second sides of the first triangle, $\phi'$ is the angle between the first and second sides of the second triangle, $\eta$ is the hitch angle, $\zeta$ is the angle between the first and third sides of the first triangle and $\zeta'$ is the angle between the first and third sides of the second triangle.

13. The system according to claim 10 wherein only the viewing angle of the rear-view mirror on the side of the vehicle towards which the trailer is angled is corrected.

* * * * *